(12) United States Patent
Wilcher (10) Patent No.: US 6,659,113 B2
(45) Date of Patent: Dec. 9, 2003

(54) GRIT WASHER AND BEARING ASSEMBLY THEREFORE

(75) Inventor: Stephen B. Wilcher, Harleysville, PA (US)

(73) Assignee: United States Filter Corporation, Palm Desert, CA (US)

(*) Notice: Subject to any disclaimer, the term of this patent is extended or adjusted under 35 U.S.C. 154(b) by 245 days.

(21) Appl. No.: 09/944,647

(22) Filed: Aug. 31, 2001

(65) Prior Publication Data

US 2002/0059946 A1 May 23, 2002

Related U.S. Application Data

(63) Continuation-in-part of application No. 09/500,309, filed on Feb. 8, 2000.

(51) Int. Cl.[7] .................................................. B08B 3/04
(52) U.S. Cl. ........................ 134/65; 134/132; 366/331
(58) Field of Search .......................... 134/132, 65, 201; 68/3 R, 23.3, 23 R; 366/314, 331; 415/110, 229; 209/155

(56) References Cited

U.S. PATENT DOCUMENTS

| | | | |
|---|---|---|---|
| 2,268,218 A | * | 12/1941 | Lum |
| 2,406,947 A | * | 9/1946 | Harlmoff |
| 2,465,145 A | | 3/1949 | Brainerd |
| 2,545,141 A | | 3/1951 | Escher |
| 2,563,336 A | * | 8/1951 | Jaeger |
| 2,598,886 A | * | 6/1952 | Brummer |
| 2,641,356 A | | 6/1953 | Hunter et al. |
| 3,062,556 A | | 11/1962 | Fino et al. |
| 3,128,713 A | * | 4/1964 | Nechine |
| 3,149,790 A | | 9/1964 | Hoffstrom |
| 3,149,888 A | * | 9/1964 | Lennon |
| 3,291,455 A | * | 12/1966 | Hamreus et al. |
| 3,292,585 A | | 12/1966 | Buschbom et al. |
| 3,327,953 A | * | 6/1967 | Krumholz et al. |
| 3,417,704 A | * | 12/1968 | Pall et al. |
| 3,433,540 A | * | 3/1969 | Schneider |
| 3,474,734 A | * | 10/1969 | Stogner |
| 3,770,109 A | | 11/1973 | Kraft |
| 3,910,833 A | * | 10/1975 | Knighton |
| 4,220,242 A | | 9/1980 | Forsberg |
| 4,256,453 A | | 3/1981 | Csapo |
| 4,300,333 A | | 11/1981 | Anderson |
| 4,443,015 A | | 4/1984 | Duffee et al. |
| 5,076,755 A | * | 12/1991 | Okada |
| 5,078,506 A | * | 1/1992 | Tischer |
| 5,258,675 A | * | 11/1993 | Nelessen |
| 5,601,239 A | | 2/1997 | Smith et al. |
| 5,715,976 A | | 2/1998 | Kautz |
| 5,797,480 A | | 8/1998 | Gaddis et al. |
| 5,831,364 A | * | 11/1998 | Buse |

OTHER PUBLICATIONS

FMC Corporation, Standard Specification SW Grit Washer, Section 14070.4, pp. 1.1–1.5, Oct. 1992.
Envirotech Corporation, Wemco Hydrogritter Separator, Bulletin No. P11–B6, 1975.
United States Filter Corporation, Link–Belt Grit Collectors and Washers, Bulletin No. USF 325–3A1, Jul. 1998.

* cited by examiner

Primary Examiner—Frankie L. Stinson
(74) Attorney, Agent, or Firm—Michael Best & Friedrich LLP

(57) ABSTRACT

A grit washer is disclosed having a bearing assembly which supports a conveyor and which is removably mounted to the exterior of the grit washer tank. With the bearing assembly being mounted to the exterior of the tank, the bearing assembly is easily accessible without the need to drain the tank or lift the screw conveyor out of the tank. The bearing assembly can therefore be easily inspected, repaired and/or replaced as necessary. The external placement of the bearing assembly also isolates the bearing assembly from the abrasive grit in the tank thereby minimizing the damage to the bearing assembly caused by the grit.

19 Claims, 7 Drawing Sheets

GRIT WASHER AND BEARING ASSEMBLY THEREFORE

This application is a continuation-in-part of U.S. Ser. No. 09/500,309, filed Feb. 8, 2000, and still pending.

FIELD OF THE INVENTION

The invention relates to grit washers, and more particularly, to a bearing assembly for use in a grit washer.

BACKGROUND OF THE INVENTION

Wastewater treatment plants typically utilize grit handling equipment which aids in reducing maintenance cost and eliminates grit related operational difficulties. This includes protecting sludge pumps, piping, centrifuges, etc. from the scouring action of grit and preventing grit from reducing the plant's overall efficiency due to clogged sumps, pipes, channels and digestion tanks.

Grit washers, such as SW type grit washers, are commonly used in wastewater treatment plants to dewater and wash grit, which has been removed from the inlet flow by other collection equipment means, to a low putrescible content of approximately 1.5 percent. When grit is removed in a dry state, water is added to the grit washer to float out all putrescible matter which is then returned to the plant flow. The grit is removed by being conveyed up an inclined steel screw trough by a screw conveyor. Grit washers typically consist of a steel tank (sized to accept the possible flow ranges while providing ample surface area for settling velocities), a screw conveyer, bearing assemblies supporting the ends of the screw conveyor shaft, support structures, a drive unit, inlet pipes, an effluent weir and a discharge trough.

One commercially available grit washer incorporates a steel sleeve and bronze bushed steel pipe sectional screw design which mates with a cast-iron or fabricated steel stub shaft which in turn is machined for lubrication entry. The stub shaft itself is mounted to the bottom of the screw trough hopper, and includes a gasket, grease grooves and drilling and tapping for alemite grease fittings, in order to allow for external greasing and lubrication of the screw bushing and shaft. In order to check for wear, the trough must be fully dewatered, cleaned out and the stub shaft removed for inspection. If the bronze bushing inside the screw pipe end is worn, then the entire screw assembly needs to be disconnected from the drive shaft and fully removed from the tank for a full inspection and replacement of the internal bushing, if required.

Another commercially available grit washer provides a pivoting screw design wherein the screw conveyor can be fully lifted out of the collection tank liquid to facilitate inspection and maintenance of the bottom screw bearing assembly.

SUMMARY OF THE INVENTION

The present invention relates to an improved grit washer. The grit washer includes a screw conveyor having one end supported by a bearing assembly. The bearing assembly is positioned outside of the grit washer tank. With the bearing assembly mounted to the exterior of the grit washer tank, the bearing assembly is easily accessible for inspection and maintenance without the need to drain the tank or lift the screw conveyor out of the tank. The bearing assembly itself can more easily be repaired or replaced if necessary. The external placement of the bearing assembly also isolates the bearing assembly from the abrasive grit in the tank thereby minimizing damage to the bearing assembly caused by the grit.

The bearing assembly preferably includes a bearing housing, a wear plate, a gland, an end plate and various seals. In one embodiment, the wear plate and gland are fabricated from non-metallic materials to eliminate the need for a lubrication system. Both the gland and the wear plate support the drive shaft thereby sharing the load and increasing their useable lives. When mounted to the exterior of the grit washer tank, the gland is easily accessible without the detachment of the remainder of the bearing assembly from the tank. Further, the orientation of the wear plate and gland within the bearing housing can be changed to extend the lives of those components.

Features and advantages of the invention will become apparent to those of ordinary skill in the art upon review of the following detailed description, claims, and drawings.

Before the embodiments of the invention are explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 1:
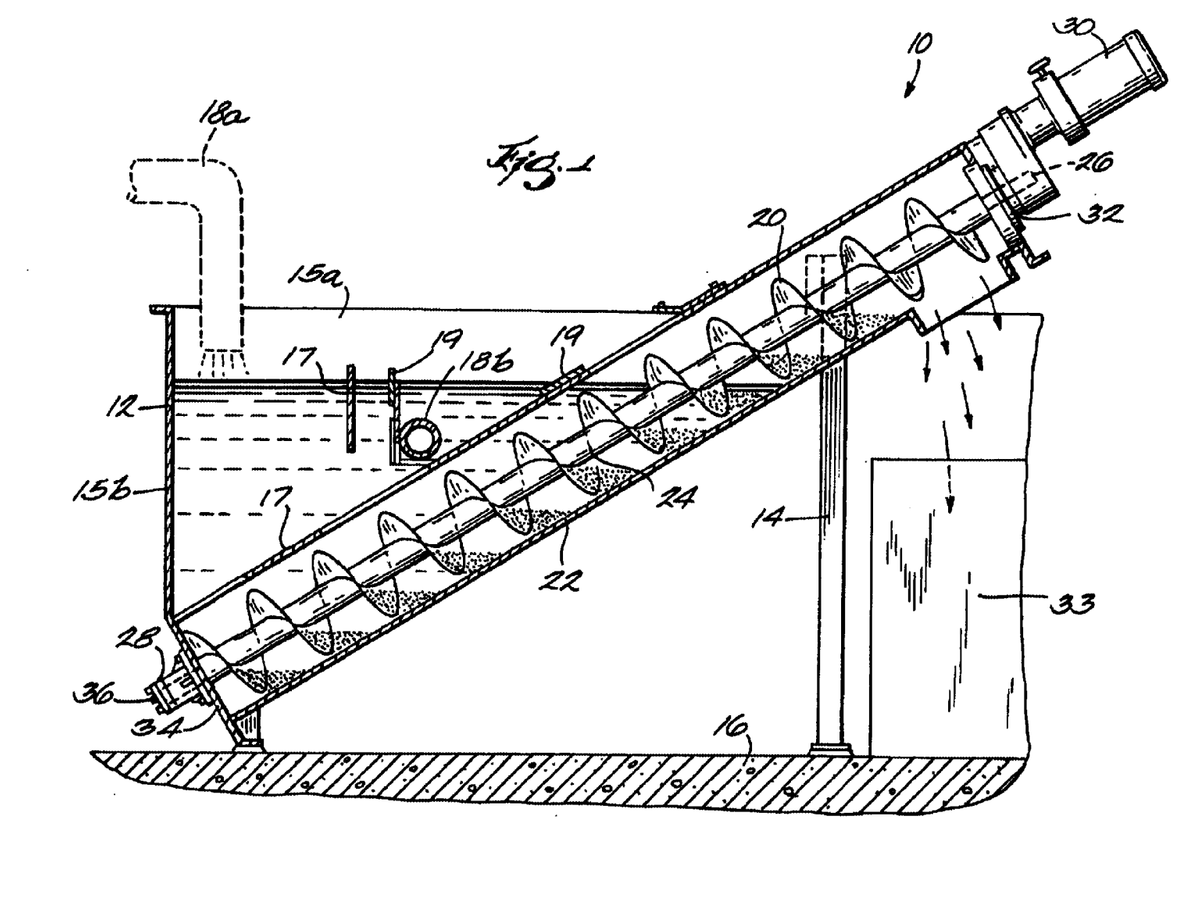
FIG. 1 is a side elevational view of a grit washer embodying the invention.

Referring now to the drawings, there is shown in FIG. 1 a grit washer 10, and more particularly, a SW type grit washer. It should be noted that the present invention is capable of being employed with other types of grit washers in addition to the SW type grit washer shown in FIG. 1. The grit washer 10 includes a tank 12 supported by a support structure 14. The tank 12 includes an interior 15a and an exterior 15b. The tank 12 is conventionally bolted to a support surface 16 and includes baffles 17 and weirs 19. The tank 12 has an influent port 18a and an effluent port 18b. A conveyor 20, such as a screw conveyor, is positioned within the tank 12, for example at a 15, 30 or 45 degree angle relative to the support surface 16, and adjacent a portion of the tank such as trough 22. The conveyor 20 includes a drive shaft 24 having a first end 26 and a second end 28. The first or upper end 26 is operationally connected to a conventional drive 30, such as a helical adjustable speed traction drive with integral C-face motor, model SK2282, available from Nord Gear Corporation of Waunakee, Wis., via an upper flange mounting assembly 32 and keyed drive shaft 26. A grit container or can 33 is typically positioned adjacent the first end 26 to contain or carry away the grit conveyed upwardly by the conveyor 20. The second or lower end 28 extends outwardly from the interior of the tank 12 through an aperture 34. A lower bearing assembly 36 is removably secured to the tank 12 adjacent the second end 28 of the drive shaft 24 and supports the second end 28 for rotation.

Figure 2:
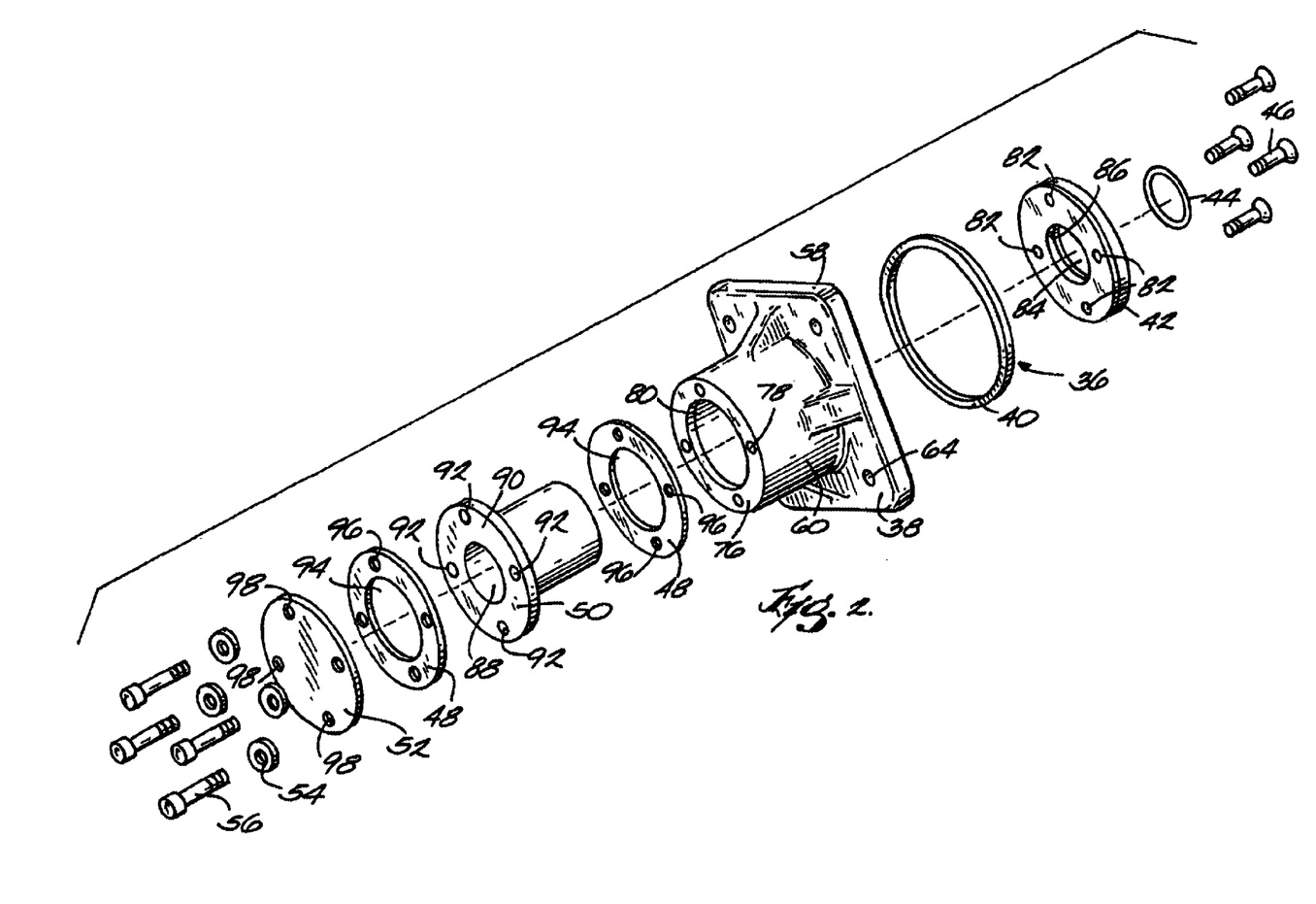
FIG. 2 is an exploded perspective view of a bearing assembly.

Turning now to FIG. 2, the lower bearing assembly 36 preferably includes components such as a bearing housing 38, a seal such as an O-ring 40, a wear plate 42, a seal such as an O-ring 44, screws 46, a pair of gaskets 48, a gland 50, an end cap 52, washers 54 and screws 56.

Figure 3:
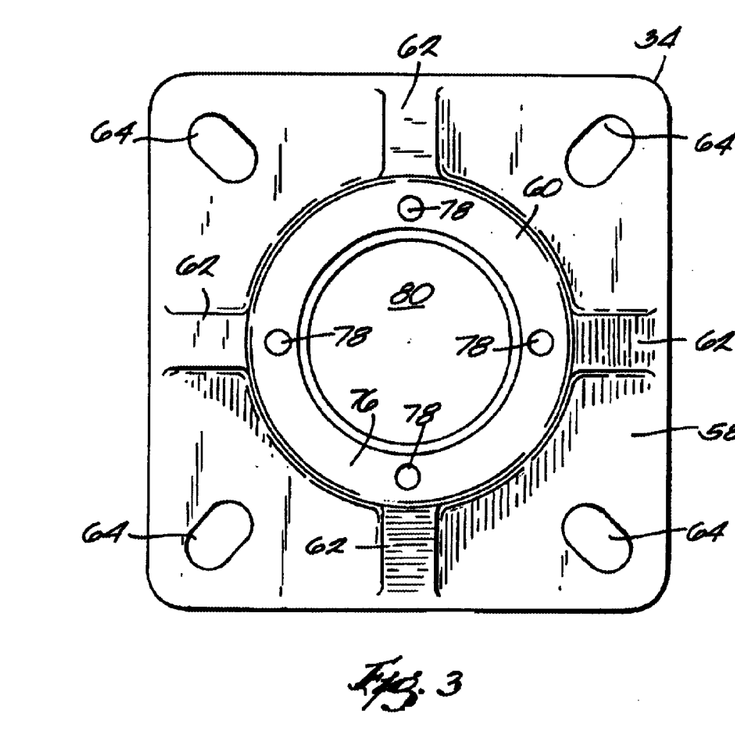
FIG. 3 is a plan view of a bearing housing.
Figure 4:
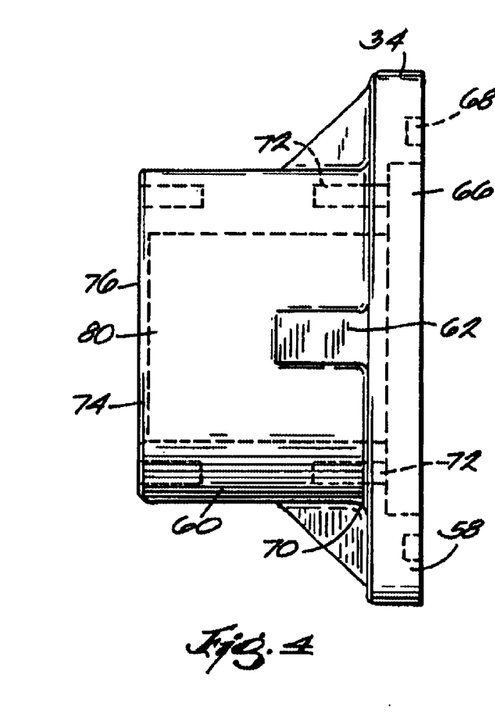
FIG. 4 is a side view of the bearing housing.

With reference to FIGS. 2 through 4, the bearing housing 38 is best shown. The housing 38 is preferably fabricated from class 30 cast iron, however, other suitable materials can also be utilized. The housing 38 includes a base portion 58 and a boss portion 60. The base portion 58 has strengthening ribs 62 and has therein four apertures 64 around its periphery. The base portion 58 includes a recessed area 66 and an annular groove 68 that are concentric and that are inward of the apertures 64. The boss portion 60 includes a first end 70, preferably integral with the base portion 58, having therein four apertures 72, (only two can be seen in FIG. 4) and a second end 74, distant from the base portion 58. The second end 74 terminates in an end surface 76 having therein four apertures 78. The boss portion 60 has therein a central, annular bore 80.

Figure 5:
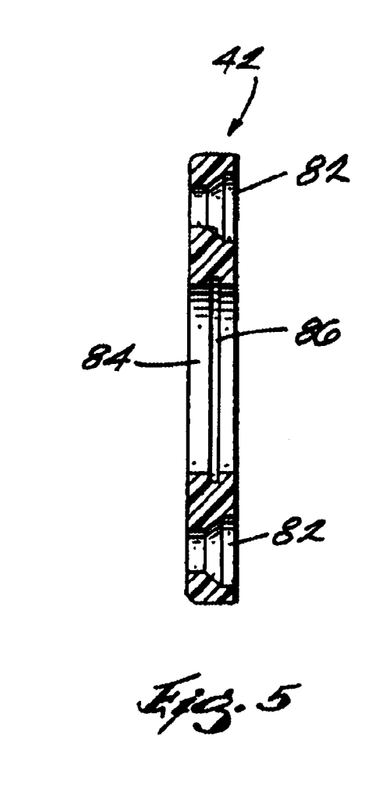
FIG. 5 is a cross-sectional view of a wear plate.

With reference to FIGS. 2 and 5, the wear plate 42 has therein four apertures 82 that are adapted to align with apertures 72 in the housing 38. The wear plate 42 is preferably annular although other shapes can be employed. The wear plate 42 is preferably fabricated from a non-metallic material such as Nylatron GSM Blue available from Polymer Corporation of Reading, Pa. or a suitable equivalent material. The wear plate 42 includes a central bore 84 and a groove 86 surrounding the bore 84. The wear plate 42 is adapted to support the end 28 of the shaft 24 for rotation. It should be noted that the orientation of the wear plate 42 relative to the housing 38 is changeable to increase the wear life of this shaft support component. The wear plate 42 prevents the passage of the majority of the grit from the tank 12 to the gland 50 area.

Figure 6:
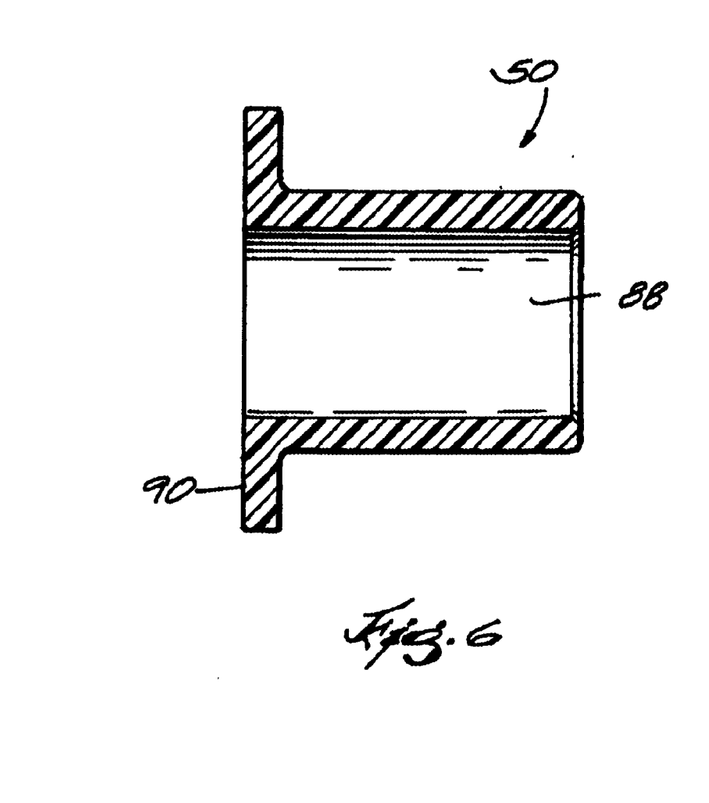
FIG. 6 is a cross-sectional view of a gland.

With reference to FIGS. 2 and 6, the gland 50 is shown. The gland 50 is preferably fabricated from a non-metallic material such as Nylatron GSM Blue or a suitable equivalent material. The gland 50 includes a central, annular bore 88 and a flange portion 90 extending outwardly from the periphery of the bore 88. The flange portion 90 has therein four apertures 92 that are adapted to align with the apertures 78 in the housing 38. The gland 50 is adapted to support the end 28 of the shaft 24 for rotation. It should be noted that the orientation of the gland 50 relative to the housing 38 is changeable to increase the wear life of this shaft component.

With reference back to FIG. 2, the gaskets 48 are preferably annular though other shapes can be employed, with a central bore 94 and having therein apertures 96. Preferably, the gaskets 48 are fabricated from neoprene or a suitable equivalent material. The end cap 52 is preferably annular, has therein apertures 98 and is preferably fabricated from A-36 steel or 304 stainless steel or a suitable equivalent material.

Figure 7:
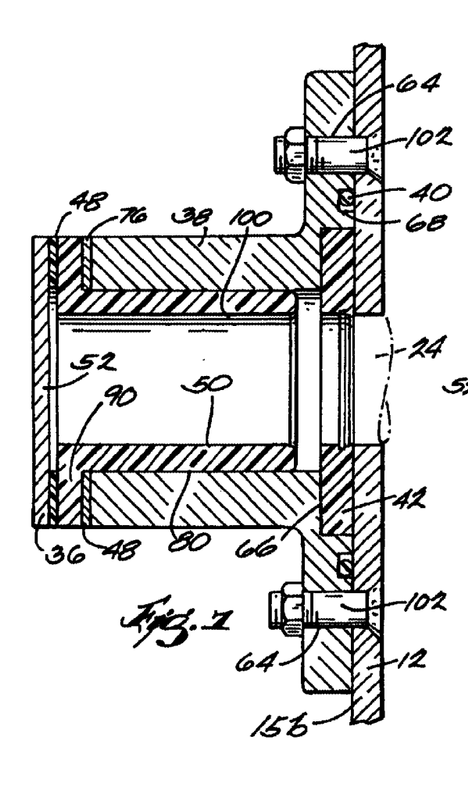
FIG. 7 is a cross-sectional view of the bearing assembly in engagement with a drive shaft and a tank of a grit washer.
Figure 8:
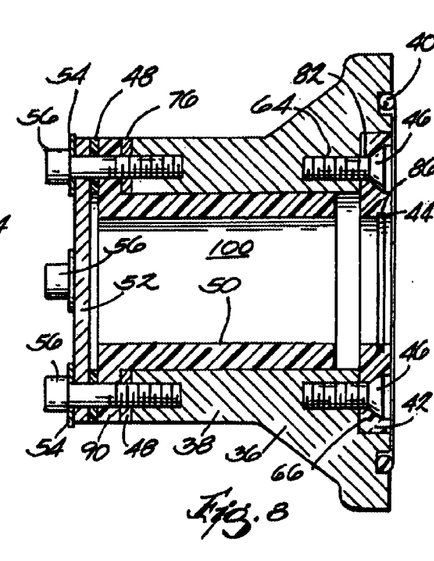
FIG. 8 is a cross-sectional view of the bearing assembly.

Turning now to the assembly of the bearing assembly 36 and with reference to FIGS. 2, 7 and 8, the O-ring 44 is positioned in the groove 86 of the wear plate 42. The wear plate 42 is positioned in the area 66 of the housing 38 and held in place with the screws 46 extending through corresponding apertures 82 in the wear plate 42 and the apertures 72 in the housing 38. The O-ring 40 is positioned in the groove 68 of the housing 38. To change the orientation of the wear plate 42, the wear plate 42 can be rotated 90 degrees and resecured to the housing 38.

With respect to the boss side of the housing 38, the first gasket 48 is positioned on the end surface 76. The gland 50 is inserted into the bore 80 of the housing 38 such that the flange portion 90 contacts the gasket 48. In this position, the gland 50 is spaced from the wear plate 42 in the interior of the housing 38. To change the orientation of the gland 50, the gland 50 can be rotated 90 degrees and resecured to the housing 38.

The second gasket 48 is positioned on the flange portion 90 and the end plate 52 positioned with the gasket 48. The apertures 78, 96, 92, 96 and 98 in the housing 38, the gasket 48, the gland 50, the gasket 48 and the end cap 52, respectively are aligned relative to each other and then held in place with the screws 56 and the washers 54. When assembled, a central passageway 100 is defined that is adapted to house the drive shaft 24 of the conveyor 20.

With reference back to FIG. 7, the bearing assembly 36 is shown mounted to the exterior 15b of the tank 12 as a one piece unit using screws 102 (only two shown in FIG. 7 with others hidden from view) positioned in the four apertures 64 of the bearing housing 38. When so mounted, the drive shaft 24 is housed in the passageway 100. The drive shaft 24 is supported by both the gland 50 as well as the wear plate 42. This load sharing arrangement increases the overall life of the gland 50 and the wear plate 42.

If the bearing assembly 36 as installed on the exterior of the grit washer tank 12 needs to be inspected, the screws 56 and washers 54 are removed and then the end cap 52 and the gasket 48 are disassembled. The gland 50 can then be removed, inspected and replaced or reinstalled without having to detach the remainder of the bearing assembly 36 from the tank 12. It should be noted that with the gland 50 removed, the wear plate 42 continues to provide support for the drive shaft 24. After inspection and/or maintenance, the bearing assembly 36 is reassembled and the screws 56 replaced.

Should the housing 38, wear plate 42 or the O-rings 40 or 44 need to be inspected or replaced, the entire bearing assembly 36, as a one piece unit, can be slid off the drive shaft 24 and detached from the tank by removing the screws 102.

The wearable or prone-to-wear components of the bearing assembly 36 are preferably not made from a metallic material in this embodiment. Rather, with the wear plate 42 and gland 50 fabricated from a non-metallic material, the bearing assembly 36 is a fully non-lubricated unit and the need for grease grooves in the gland and a lubricator or lubrication system are eliminated.

With the bearing assembly 36 being mounted to the exterior of the grit washer tank 12, the bearing assembly 36 is easily accessible without the need to drain the tank 12 or lift the screw conveyor 20 out of the tank 12. The bearing assembly 36 can more easily be inspected and repaired/ replaced as necessary. The exterior placement of the bearing assembly 36 also isolates the bearing assembly 36 from the abrasive grit in the tank 12 thereby minimizing the incidents of damage to the bearing assembly 36 caused by the grit.

Figure 9:
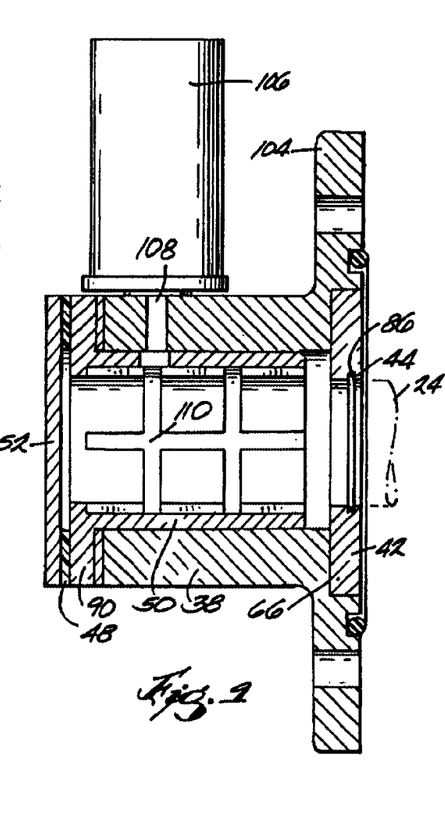
FIG. 9 is a cross-sectional view of a second embodiment of the bearing assembly.

Turning now to FIG. 9, a second embodiment of a lower bearing assembly 104 is shown, in which like reference numerals refer to like elements. This lower bearing assembly 104 is designed and adapted to be used with an automatic lubricator 106, such as model #LAGD 125/EM2 available from SKF USA Inc. of King of Prussia, Pa. The housing 38 includes a lubrication channel 108. The gland 50 includes grease grooves 110 and is preferably fabricated from SAE 660 bronze or a suitable equivalent. The wear plate 42 is preferably fabricated from SAE 660 bronze or a suitable equivalent. In this embodiment, the automatic lubricator 106 supplies lubricant to the bearing assembly 104.

Figure 10:
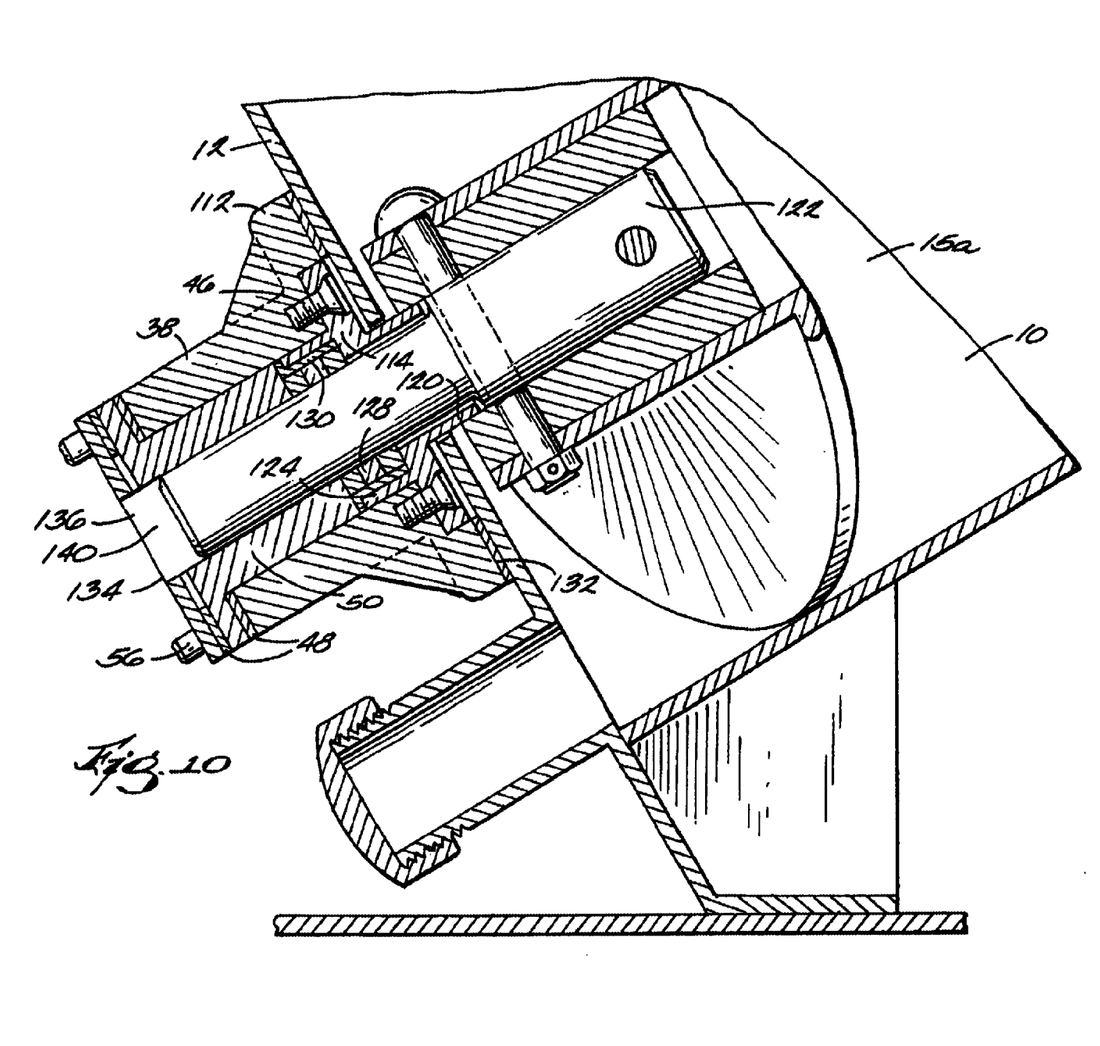
FIG. 10 is partial cross-sectional view of a grit washer including a third embodiment of the bearing assembly.
Figures 11, 12:
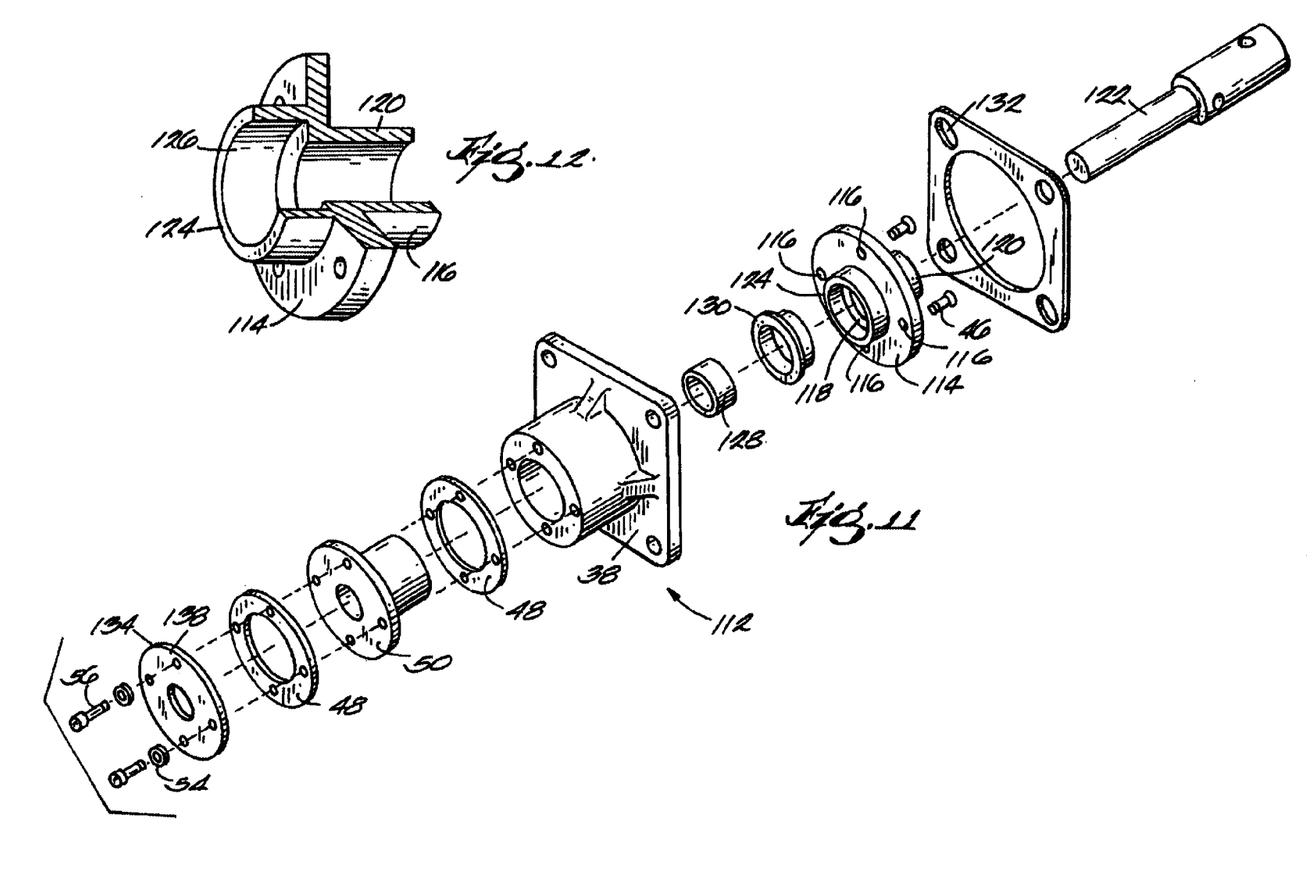
FIG. 11 is an exploded view of the bearing assembly shown in FIG. 10.
FIG. 12 is a partial cross-sectional view of a wear ring of the bearing assembly shown in FIG. 10.

Turning now to FIGS. 10–12, a third embodiment of a lower bearing assembly 112 is shown, in which like reference numerals refer to like elements. The bearing assembly 112 particularly includes a wear ring 114 which provides a non-rotating, non-wearing grit barricade for the gland 50. The wear ring 114 provides an effective structure for blocking grit from gaining access to the gland 50 and limiting excessive wear of the gland 50.

The wear ring 114 has therein four apertures 116 that are adapted to align with apertures in the housing 38, includes a central bore 118 and is preferably annular although other shapes can be employed. It should be noted that the orientation of the wear ring 114 relative to the housing 38 is changeable to increase its wear life. The wear ring 114 is preferably fabricated from a non-metallic material such as Nylatron GSM Blue available from Polymer Corporation of Reading, Pa. or a suitable equivalent material.

The wear ring 114 includes a first hub 120 that is positionable to project into the interior 15a of the tank 12. The length of the first hub 120 can be varied as needed for specific applications. A lower shaft 122 projects from and is appropriately secured to the shaft 24. The wear ring 114 has a clearance fit over the lower shaft 122 so that the wear ring 114 does not contact the shaft 24 and rotational internal wear of the wear ring 114 will be minimized. The wear ring 114 acts as a support for the lower shaft 122 when the gland 50 is removed for replacement or rotation during maintenance.

The wear ring includes a second hub 124 projecting outwardly in a direction opposite to that of the first hub 120. The second hub 124 includes a counterbore 126. Packing materials 128, for example Synthepak® packings from Garlock Inc., fit snugly into the second hub 124 via a packing holder 130. The packing holder 130 allows proper preassembly and positioning of the packing materials 128 and allows for ease of final assembly of the bearing assembly 112. The packing materials 128 further seal the gland 50 from the intrusion of water containing very fine highly abrasive grit particles.

Finally, the bearing assembly 112 includes a flat mounting gasket 132 and an end plate 134. The end plate 134 is adapted to accommodate a speed or motion sensor 136. A hole 138 in the center of the end plate 134 allows the positioning of the sensor 136, such as with a sensor mounting stud 140, adjacent the lower shaft 122.

The bearing assembly 112 is assembled similarly to the bearing assembly 36 as is illustrated in FIG. 10.

The illustrated preferred embodiments of the bearing assemblies 36, 104 and 112 are shown to include components having four apertures that house four screws. It should be noted that the number of apertures per component can vary and that other types of fasteners other than screws can also be utilized. It should also be noted that the external shape of the bearing assemblies 36, 104 and 112 can be varied to include configurations that are rectangular or oval, for example.

I claim:

1. A grit washer comprising:

a tank;

a conveyor positioned within said tank, said conveyor including a rotatable shaft having an end; and a bearing assembly for supporting said end for rotation, said assembly including a bearing housing, a gland, a wear ring, and packing materials, said wear ring including first and second hubs projecting in opposite directions relative to one another, said packing materials are positioned within one of said hubs.

2. The grit washer as set forth in claim 1 wherein said conveyor is a screw type conveyer.

3. The grit washer as set forth in claim 1 wherein the tank has an interior and an exterior, and wherein one of said hubs projections into said interior.

4. The grit washer as set forth in claim 1 and further including a packing holder for supporting said packing materials in said hub.

5. The grit washer as set forth in claim 1 and further including a sensor adapted to sense motion of said shaft.

6. The grit washer as set forth in claim 1 wherein said packing materials and said wear ring function as a grit barricade for said gland.

7. The grit washer as set forth in claim 1 wherein said wear ring is non-metallic.

8. A grit washer comprising:

a tank having an interior, an exterior and an aperture;

a rotatable shaft having a first end wherein said end extends outwardly of said interior through said aperture; and a bearing assembly for supporting said end for rotation, said assembly accessible from said exterior of said tank and including a bearing housing, a gland and a wear ring, said wear ring including a first hub projecting into said interior of said tank.

9. The grit washer as set forth in claim 8 wherein said wear ring includes a second hub extending in a direction opposite to that of said first hub, and wherein said bearing assembly further includes packing materials within said second hub.

10. The grit washer as set forth in claim 9 and further including a packing holder for supporting said packing materials in said second hub.

11. The grit washer as set forth in claim 9 wherein said packing materials function as a grit barricade for said gland.

12. The grit washer as set forth in claim 8 and further including a sensor adapted to sense motion of said shaft.

13. The grit washer as set forth in claim 8 wherein said wear ring functions as a grit barricade for said gland.

14. A grit washer comprising:

a tank having an interior and an exterior;

a conveyor including a rotatable shaft having an end projecting into said exterior of said tank; and a bearing assembly for supporting said end of said shaft for rotation, said assembly including a housing positioned in said exterior, a gland positioned in said exterior, and a wear ring, said wear ring including a first portion extending into said interior of said tank and a second portion positioned in said exterior of said tank.

15. The grit washer as set forth in claim 14 wherein said first and second portions are hubs.

16. The grit washer as set forth in claim 14 wherein said first portion and said second portion extending in opposite directions relative to one another.

17. The grit washer as set forth in claim 14 and further including packing materials positioned within said second portion.

18. The grit washer as set forth in claim 17 and further including a packing holder for supporting said packing materials.

19. The grit washer as set forth in claim 14 wherein said wear ring forms a grit barricade for said gland.

* * * * *